(12) United States Patent
Wakeford et al.

(10) Patent No.: US 10,300,379 B1
(45) Date of Patent: May 28, 2019

(54) FACILITATING CONTEXTUAL GAME NOTIFICATIONS AND SMART ACTION OPTIONS

(71) Applicant: Electronic Arts Inc., Redwood City, CA (US)

(72) Inventors: Kent Wakeford, Hillsborough, CA (US); David Hernandez-Cerpa, San Francisco, CA (US); Tyler Gee, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 297 days.

(21) Appl. No.: 14/980,787

(22) Filed: Dec. 28, 2015

(51) Int. Cl.
*A63F 13/35* (2014.01)
*H04L 29/06* (2006.01)
*H04L 29/08* (2006.01)

(52) U.S. Cl.
CPC ............ *A63F 13/35* (2014.09); *H04L 65/403* (2013.01); *H04L 67/10* (2013.01); *H04L 67/26* (2013.01); *H04L 67/38* (2013.01)

(58) Field of Classification Search
None
See application file for complete search history.

(56) References Cited

U.S. PATENT DOCUMENTS

| 6,763,384 | B1 | 7/2004 | Gupta |
| 7,124,175 | B1 | 10/2006 | Wolfe |
| 7,788,176 | B2 * | 8/2010 | Gupta ..................... A63F 13/12 463/41 |
| 8,038,535 | B2 | 10/2011 | Jensen |
| 8,393,967 | B2 | 3/2013 | Farrier |
| 8,430,755 | B2 | 4/2013 | Youm |
| 8,734,254 | B2 * | 5/2014 | Aguilar, Jr. ............. G07F 17/32 463/40 |
| 8,764,568 | B2 | 7/2014 | Holme |
| 8,771,081 | B2 | 7/2014 | Walker |

(Continued)

FOREIGN PATENT DOCUMENTS

WO   2001035600   5/2001

OTHER PUBLICATIONS gw.igg.com, Godswar, Aug. 14, 2009, www.archive.org, 9 pages.
www.thebuddyforum.com, Honorbuddy1, Apr. 14, 2011, 6 pages.
www.thebuddyforum.com, Honorbuddy2, Mar. 11, 2011, 5 pages.

*Primary Examiner* — James S. McClellan
*Assistant Examiner* — Peter J Iannuzzi
(74) *Attorney, Agent, or Firm* — Knobbe, Martens, Olson & Bear, LLP

(57) ABSTRACT

A system and method for facilitating contextual game notifications and smart action options for one or more online games. Occurrence information regarding occurrences in the virtual space in which an online game takes place may be received. Notifications for presentation on a client computing platform may be generated in response to a determination that a given user is not participating in the online game through any client game application. One or more action options for presentation in association with the notification may be determined. A user may accept one or more action options without launching the client game application. In response to a user accepting the one or more action options, corresponding action requests for executing actions within the virtual space may be received and executed within the virtual space without launching the client game application.

12 Claims, 6 Drawing Sheets

(56) References Cited

U.S. PATENT DOCUMENTS

| | | | |
|---|---|---|---|
| 8,805,939 B2 | 8/2014 | Ye | |
| 8,840,465 B2 | 9/2014 | Mello | |
| 9,616,345 B2* | 4/2017 | Harvey | A63F 13/798 |
| 2004/0230661 A1 | 11/2004 | Rashid | |
| 2007/0097832 A1 | 5/2007 | Koivisto | |
| 2007/0260567 A1 | 11/2007 | Funge | |
| 2007/0265091 A1* | 11/2007 | Aguilar, Jr. | G07F 17/32 463/42 |
| 2008/0090659 A1* | 4/2008 | Aguilar | A63F 13/12 463/42 |
| 2009/0264190 A1* | 10/2009 | Davis | G07F 17/32 463/26 |
| 2010/0029386 A1 | 2/2010 | Pitsch | |
| 2010/0056280 A1* | 3/2010 | Langan | A63F 13/12 463/42 |
| 2011/0016182 A1 | 1/2011 | Harris | |
| 2012/0142429 A1 | 6/2012 | Muller | |
| 2012/0179750 A1 | 7/2012 | Gollapalli | |
| 2012/0238365 A1 | 9/2012 | Gaiba | |
| 2012/0283014 A1 | 11/2012 | Van Luchene | |
| 2013/0035164 A1* | 2/2013 | Osvald | A63F 13/12 463/42 |
| 2013/0054689 A1 | 2/2013 | Woldman | |
| 2013/0090170 A1 | 4/2013 | Reed | |
| 2013/0172068 A1* | 7/2013 | Zhou | G06Q 30/02 463/16 |
| 2014/0232534 A1 | 8/2014 | Birnbaum | |
| 2014/0357350 A1 | 12/2014 | Weingardt | |
| 2015/0065095 A1 | 3/2015 | Seo | |
| 2015/0172441 A1 | 6/2015 | Samhat | |
| 2015/0341901 A1 | 11/2015 | Ryu | |

* cited by examiner

FACILITATING CONTEXTUAL GAME NOTIFICATIONS AND SMART ACTION OPTIONS

FIELD OF THE DISCLOSURE

This disclosure relates to facilitating contextual game notifications and smart action options for one or more online games.

BACKGROUND

Notifications enable a user to be abreast with occurrences in online games. However, users may not be able to access the game and/or game application when the notification is presented. Often the user is left without a choice to respond to the in-game occurrences.

Facilitating game notifications on client computers is generally known. Conventionally, notifications regarding activities that have transpired in online games may be generated and presented on client computers. In response to such notifications, users of the online games may be facilitated to launch game applications on their client computer to participate in the online games.

SUMMARY

One aspect of the disclosure relates to facilitating contextual game notifications and smart action options for one or more online games. Notifications regarding occurrences related to a user's participation in the online games may be generated. The notifications may include action options such that a user may be able to initiate an action within the online game without launching the client game application. Acceptance of or more of the action options presented to a user on a client computing platform and/or wearable device may cause one or more corresponding action requests to be transmitted to one or more game servers for execution in the virtual space in which the online game takes places. Because the actions requests may be transmitted to one or more game servers for execution once accepted, the client computing platform and/or wearable device does not have to launch and/or have the capability to launch the client game application. As such, a user may continue to interact with and/or run other applications on their client computing platform (without having to run the client game application) while initiating actions within the online game. Furthermore, a user may not have to wait for the client computing platform to launch the client game application which may enable the user to take quick actions within the online game when a notification is received. Additionally, client computing platforms that may not have the capability and/or capacity to efficiently launch and/or run the client game application, may still be used to present notifications and/or action requests to users in a convenient manner.

A system configured to facilitate user interaction across multiple online games may include one or more servers. The servers may operate in a client/server architecture with one or more client computing platforms. The client computing platforms may be associated with the users of the virtual space. The servers may be configured to execute one or more of: a game component, a user component, an occurrence detection component, a notification component, and/or other components. The client computing platforms may be configured to execute one or more components the same as or similar to the servers.

The game component may be configured to execute one or more instances of a virtual space in which an online game takes place. The instance of the virtual space executed by the game component may be associated with an online game in which the user participates. The game component may receive commands from client computing platforms associated with users. The commands may be executed within the virtual space to facilitate participation of the users with the virtual space and/or online game. Views of the virtual space may be presented in game interfaces for the online game on the client computing platforms by running a client game application.

The user component may be configured to access and/or manage one or more user accounts associated with individual users of the online game. The user accounts managed by the user component may include user information regarding the individual users of the online game. For example, the user information may include one or more of user presence information, user activity information, user response information, user profile information, information reflecting a balance of stored consideration associated with the individual user usable in the online game, historic transaction information indicating previous spending by the user in the online game, and/or any other user information. The user presence information may indicate whether the user is participating in the online game via a client game application. The user activity information may relate to the current activity of a user in the real world. The user response information may indicate and/or describe past responses to occurrences by the given users. The user accounts managed by the user component may include a first user account associated with a first user. For example, the first user account may include first user presence information indicating whether or not the first user is participating in the online game through a client game application.

The occurrence detection component may be configured to detect occurrences in the virtual space in which the online game takes place. In some implementations, the occurrence detection component may be configured to detect occurrences within online games and/or the virtual space(s) of the online game(s). An occurrence may include something that happens and/or occurs within the virtual space and/or online game that may impact and/or affect the user's gameplay, virtual items and/or entities under the user's control, and/or other aspects of the user's interaction the online game. The detection of the occurrences in the virtual space(s) may involve monitoring state changes taking place in the virtual space(s), determining an occurrence has happened when certain state changes have taken place in the virtual space(s), determining participation in the online game(s) by one or more users that may be impacted by a particular occurrence in a given online game, and/or any other operations. The occurrences detected by the occurrence detection component may include a first occurrence that happens in the virtual space of the online game. The first occurrence may relate to participation by the first user in the online game and/or within virtual space.

The notification component may be configured to generate notifications indicating occurrences in the online game (s). The notifications may be generated by the notification component for presentation on client computing platforms and/or wearable devices. The generation of the notifications by the notification component may be based on one or more of: occurrence information being obtained; a determination that the user is not participating in the online game through any client game application; and/or any other happening(s) and/or information.

The notification component may be configured to determine one or more action options for presentation in association with the notification(s) generated. The action options may correspond to individual action requests for executing actions in the instance of the virtual space. In some implementations, in response to a user accepting one or more of the action options, the corresponding individual action requests may be transmitted from the client computing platform associated with the user to the system (e.g., to be received by the game component). A user may accept one or more of the action options via the client computing platform and/or wearable device without launching the client game application. For example, a user may accept one or more action options via a touch input, voice input, secondary device input (e.g., a mouse, keyboard, etc.), button input, and/or other input.

In some implementations, whether or not the notifications regarding the occurrences in the online game(s) should be presented and/or which action options should be presented is determined based on user activity information, user response information (e.g., for past occurrences), user preferences, and/or other information. The notification generated by the notification component may include a first notification about the first occurrence in the virtual space.

The notification component may include one or more sub-components. For example, the notification component may include one or more of a user past response analysis component, a user activity analysis component, a notification and action option determination component, a notification generation component, and/or other sub-components. The user activity information may be analyzed by the user activity analysis component to determine whether a notification and/or action options should be presented to a user, and/or which action options should be presented with the notification of the occurrences. The user response information may be analyzed by the user past response analysis component to determine whether a notification and/or action options should be presented to a user, and/or which action options should be presented with the notification of the occurrences.

The game component may be configured to receive one or more action requests from the client computing platform associated with the user. The one or more action requests received may correspond to one or more of the action options determined and/or presented to the user in association with the notification of a given occurrence. The game component may be configured to execute the action (e.g., corresponding to the action request) in the virtual space without launching the game application.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
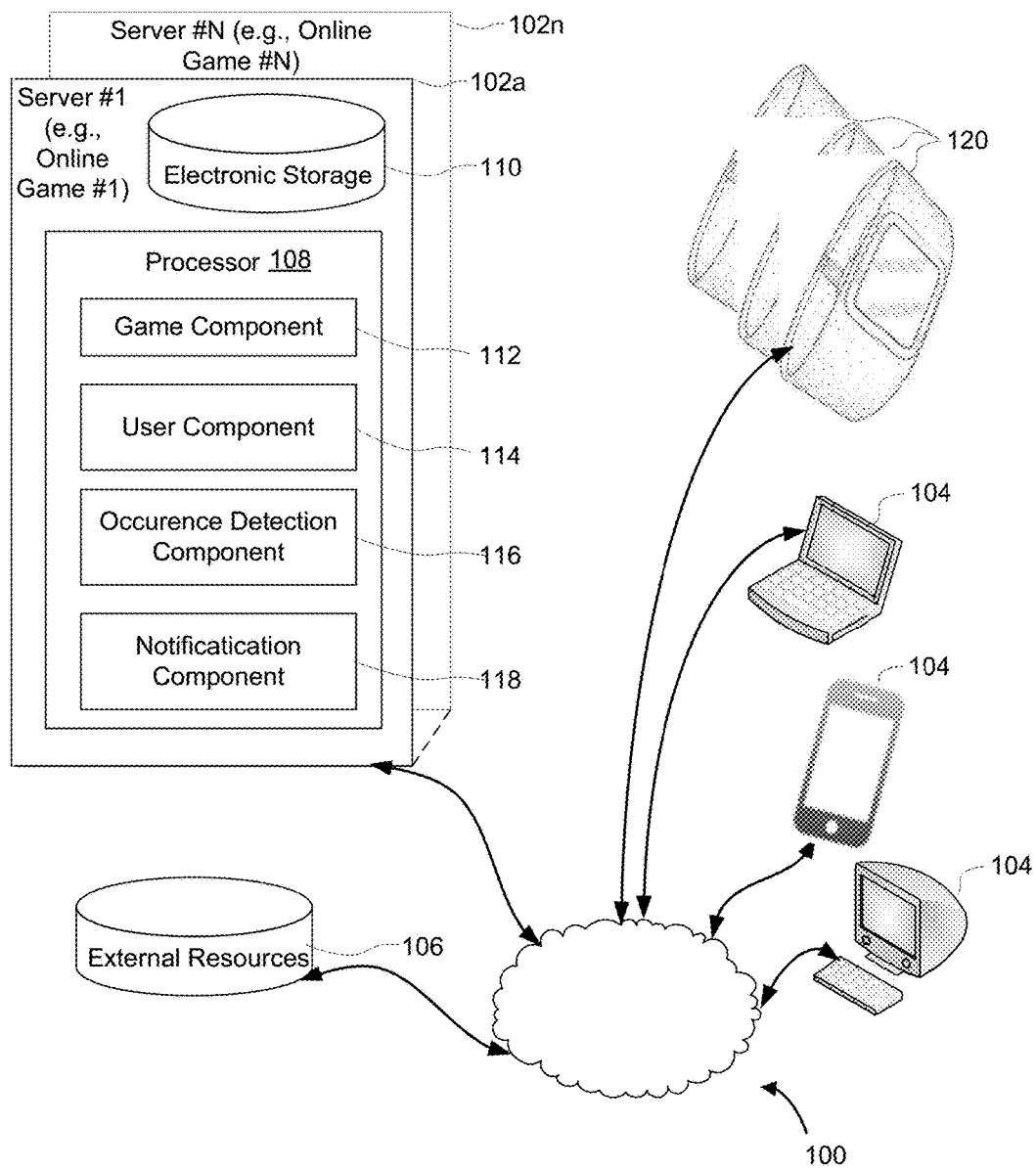
FIG. 1 illustrates a system to facilitate contextual game notifications and smart action options for one or more online games in accordance with one or more implementations.

FIG. 1 illustrates a system 100 for facilitating contextual game notifications and smart action options for one or more online games. The system may provide one or more of the online games. Providing online games may include hosting the online games over a network. In some implementations, as shown in this example, system 100 may include one or more servers 102, such as the server 102a-n shown, configured for hosting online games. The servers 102 may be configured to communicate with one or more client computing platforms 104 according to a client/server architecture, and with each other. The users may access system 100 and/or the game spaces associated with the online games via client computing platforms 104. As shown, a given server 102, such as the server 102a shown, may comprise a processor 108 configured to execute computer readable instructions to implement system components. The computer program components may include one or more of a game component 112, a user component 114, an occurrence detection component 116, a notification component 118, and/or other components.

The game component 112 may be configured to execute an instance of a virtual space in which an online game takes place. The game component 112 may be configured to implement the instance of the virtual space by receiving commands from client computing platforms associated with users. Game component 112 may execute the commands in the instance of the virtual space to facilitate participation of the users in the online game. Users may participate in the online game through client game applications implemented on the client computing platforms associated with the users.

Within the instance of the virtual space in which the online game takes place, users of the online game may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the virtual space by game component 112 may include determining a state associated with the virtual space and/or online game. The state may be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may be persistent. That is, the virtual space and/or online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

The instance of the virtual space may comprise a simulated virtual space, e.g., a virtual space that is accessible by users via clients (e.g., client computing platforms 104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space in which an online game takes place may comprise virtual space entities automatically controlled in the instance of the online game. Such virtual space entities may not be associated with any user. As such, the automatically controlled virtual space entities may be generated and/or developed by artificial intelligence configured with the server(s) 102 by a provider, administrator, moderator, and/or any other entities related to the online game. These automatically controlled entities may evolve within the virtual space associated with the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 102. As used herein, such automatically controlled virtual space entities in the instance of the online game are referred to as "non-player entities".

It should be understood the above description of the manner in which state of the virtual space associated with the online game as determined by game component 112 is not intended to be limiting. The game component 112 may be configured to express the virtual space in a more limited, or richer, manner. For example, views determined for the virtual space representing the state of the instance of the virtual space may be selected from a limited set of graphics depicting an occurrence in a given place within the virtual space for the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the virtual space executed by game component 112, the users may participate by controlling one or more of an element in the virtual space associated with the online game. The user-controlled elements may include avatars, game space characters, game space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the virtual space may be exercised through commands input by a given user through client computing platforms 104. The given user may interact with other users through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the game component 112).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

The game component 112 may be configured to execute user actions to facilitate participation of the users in the online game, the virtual space associated with the online game, and/or each other in response to receiving game and/or virtual space commands input by the users. Execution of the user action by the game component 112 may produce changes to the game state, which may reflect progresses and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

User component 114 may be configured to access and/or manage one or more user accounts associated with individual users of the online game(s). The user accounts managed by the user component 114 may include user information regarding the individual users of the online game(s). The user information may be stored in a network storage location such as the electronic storage 126, and/or any other storage locations. User component 114 may be configured to manage user accounts comprising user information regarding the users. The user information managed by user component 114 and/or included in the user accounts may include user presence information. User presence information may indicate whether the users are participating in the online game through the client game applications. For example, a user account associated with a given user may include user presence information indicating whether or not the given user is participating in the online game through a client game application. The user presence information may be updated in real-time and/or near real time. As such, for example, the user presence information may indicate, at any given time, whether or not the user is participating in the online game through any client game application. In some implementations, the user presence information may indicate whether or not the client game application is running on the client computing platform associated with the user.

In some implementations, the user information may include information reflecting a balance of stored consideration associated with the individual user usable in the given online game. The stored consideration may include, for example virtual currencies, real-world money, virtual objects, virtual resources, real-world objects (e.g., coupons) and/or any other stored consideration usable in the online game. Balances of such stored consideration may be maintained, modified, account, retrieved, tracked, and/or otherwise managed by the user component 114. By way of non-limiting example, the user information in the user account associated with the user for the online game may reflect that the user has 50 gems (e.g., a virtual currency) in the online game; and/or the user information in the user account associated with the user for the online game may reflect that the user has 30 ores (e.g., a virtual currency) in the second online game.

The user information in the user account associated with the given user for a given online game hosted by system 100 may include historic transaction information indicating previous spending by the user in the given online game. In some exemplary implementations, such historic transaction information may reflect various statistics and details about the individual spending by the user in the given online game. Examples of such statistics may include a number of times a user spends virtual currency in exchange for virtual items (e.g., a number of transactions), a frequency of such spending by the user with in a time period of interest (e.g., past 24 hours, past week, past month, etc.), an average amount spent by the user, an average amount spent by the user to forgo a particular active action in a time period of interest, and/or any other statistics.

In some implementations, user component 114 may be configured to obtain, receive, and/or determine user activity information regarding current activity in the real-world by the given user. The activity information obtained by the user component 114 may indicate a current activity including jogging, walking, driving, sleeping, swimming, and/or any other type of activity by the given user in the real-world. In some implementations, the user component 114 may obtain and/or receive the user activity information from personal devices associated with the users, such as client computing platform(s) 104, wearable device 120, sensors, and/or any other type of personal device associated with the given user.

The user component 114 may be configured to obtain user response information indicating past responses by the given user to the occurrences in the first online game. The past responses by the given user as indicated by the user response information may indicate whether or not the users responded and/or typically responded to the occurrences by initiating action requests through the client game application. For example, without limitation, a response as indicated by the user response information may indicate whether the given user initiated an action or actions after the first occurrence in the virtual space of the first online game. In some implementations, the past responses may indicate gameplay initiated by the user in the first online game after and/or in response to the first occurrence. For instance, a past response may indicate that the given user took an action after his/her base was attacked (e.g., an example first occurrence) in the virtual space of the first online game. As another example, the response may indicate that the given user did not take an action after a virtual space character of the given user recovered full stamina in the virtual space of the first online game. The specificity of the response captured by the user response information may be designated and/or determined by the provider of the first online game. For example, the response may indicate a date and time when the user took the action after his/her base was attacked in the virtual space of the first online game and/or a real-world location where the user took the action.

In some implementations, the responses as indicated by the user response information may indicate a frequency at which the given user initiated an action or actions after the first occurrence in the first online game. For example, without limitation, the user response information may indicate the given user initiated on average 5 actions every 10 occurrences of his/her base was attacked in the virtual space of the first online game. As another example, the user response information may indicate the given user initiated on average 10 actions every week after his/her base was attacked in the virtual space of the first online game.

In some implementations, the responses as indicated by the user response information may indicate average time elapse between the first occurrence in the virtual space of the first online game and the given initiated an action or actions in the first online game. For example, the user response information may indicate that the given user initiated an action on average one minute after his/her base was attacked in the virtual space of the first online game. As another example, the user response information may indicate that the given user initiated an action on average one hour after his/her virtual character becomes available for the given user to use in the virtual space of the first online game.

In some implementations, the responses as indicated by the user response information may indicate average spending by the given user after the first occurrence in the virtual space of the first online game. For example, the user response information may indicate that the given user spent, on average, 3 dollars after every occurrence of his/her base being attacked in the virtual space of the first online game. As another example, the user response information may indicate that the given user spent no money after every occurrence of his/her virtual character becoming available for the given user to use in the virtual space of the first online game.

In some implementations, the responses as indicated by the user response information may indicate responses by other users in the online game, other than the given user. For example, without limitation, the responses may indicate that a number (e.g., 100) of other users initiated an action in response to and/or after the first occurrence within the online game (e.g., their bases were attacked) during a predetermined period (e.g., past week).

The occurrence detection component 116 may be configured to detect occurrences in one or more online games. For example, the occurrence detection component 116 may be configured to detect occurrences in one or more virtual spaces associated with one or more online games hosted by system 100. The occurrence detection component may obtain occurrence information regarding occurrences in the virtual space. Whether or not occurrence information indicates an occurrence should be detected may be determined based on occurrence criteria. The occurrence criteria may be determined and/or selected by a user, online game provider, system provider, and/or other entity. Responsive to the occurrence information satisfying the occurrence criteria for an occurrence within the online game, occurrence detection component 116 may identify an occurrence within the online game.

The detection of the occurrences in the virtual space by the occurrence detection component 116 may include one or more of: monitoring state changes taking place in the virtual space(s) and/or online game(s), determining an occurrence has happened when a particular state change is detected in virtual space(s) and/or online game(s), determining participation in the online game(s) by one or more users that may be impacted by the one or more occurrences in the online game(s), and/or any other operations. In some implementations, for example, an occurrence may include something that happens and/or occurs within the virtual space and/or online game that may impact and/or affect the user's gameplay, virtual items and/or entities under the user's control, and/or other aspects of the user's interaction with the online game and/or virtual space. By way of non-limiting example, an occurrence may include one or more of: an event (e.g., a tournament, quest, etc.) and/or results of an event available to the user within the online game; an attack, raid, and/or other phenomena that has transpired in the online game impacting the user's base and/or virtual entity; a virtual resource and/or entity being upgraded and/or being able to be upgraded; virtual building(s) or equipment associated with the user being ready to be employed (e.g., used); virtual character(s) and/or troop(s) being ready to be deployed (e.g., used); virtual character(s) having recovered stamina and/or health (e.g., from injuries or past use), and/or any other occurrences within the online game and/or virtual space.

By way of example, without limitation, a state change indicating a first occurrence may include an earthquake has taken place in a particular area in the virtual space associated with the online game. After detecting such a state change in the virtual space of the online game, the occurrence detection component 116 may determine the size and location of the area where the earth quake took place. After determining such, the occurrence detection component 116 may determine that a number of players of the online game have built their virtual towns in the area affected by the earth quake and thus those players' participation in the online game is impacted by the earthquake. For instance, the occurrence detection component 116 may determine the earthquake impacts the participation of a number of players including the first player in the online game because the first player has a virtual town in the area where the earthquake affects.

The client computing platform(s) 104 may include one or more processors, memory, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 100.

The client computing platform(s) 104 may be configured to: present a graphical representation of the virtual space corresponding to a given online game; provide controls enabling the given user to maneuver virtual items, initiate actions, and/or purchase virtual item(s) usable in the online game(s) within the virtual space associated with the online game; determine information for implementing game interfaces for the online game(s) hosted by system 100; obtain state information regarding a given online game hosted by the system 100; determine a view point of the user at a given time; determine a level of rendering of a scene in the online game based on the state information and view point; determining one or more action menus for presentation to the user in the game interface; facilitate interaction by the given user in the online game(s) and/or interaction with other users; communicate with sever(s) simulate (e.g., receive and/or transmitting information to/from servers 102); and/or provide any other functionality. In some implementations, client computing platform 104 may be the same as or different from wearable device 120. Client computing platform 104 may be configured to communicate with, transmit information to, and/or receive information from one or more of servers 102, wearable device 120, and/or other components of system 100.

The notification component 118 may be configured to generate notifications. The notifications may include game notifications. The notifications may indicate one or more occurrences in the online game(s). Notification component 118 may generate notifications for presentation to a given user on a client computing platform associated with a given user. The notifications may be generated in response to one or more of: the occurrence information being obtained; a determination that the user is not participating in the online game through any client game application; and/or any other happening(s) and/or information. The determination that the user is not participating in the online game through any client game application may be based on the presence information associated with the user. For example, a notification may be generated for presentation to a given user on a client computing platform associated with the given user responsive to occurrence information being obtained and/or a determination that the first user is not participating in the online game through any client game application.

The notifications generated by the notification component 118 may include notifications that are generated and/or presented to the user on and/or via a client computing platform without launching the client game application. The notifications may include a visible, audible, palpable, and/or otherwise sensible communication notifying the user of one or more occurrences within the virtual space and/or online game. For example, the notifications may include one or more of a visual alert, text message, a voice notification, an audible alert, a push notification, a haptic notification, and/or any other types of notifications presented to a user on a client computing platform. In some implementations, the notifications generated by the notification component 118 may be transmitted to a wearable device 120 (e.g., via a client computing platform 104) associated with the given user for presentation of the notifications. The wearable device 120 may be separate from a client computing platform that launches the client game application. The wearable device 120 may or may not be able to launch the client game application.

Figure 2:
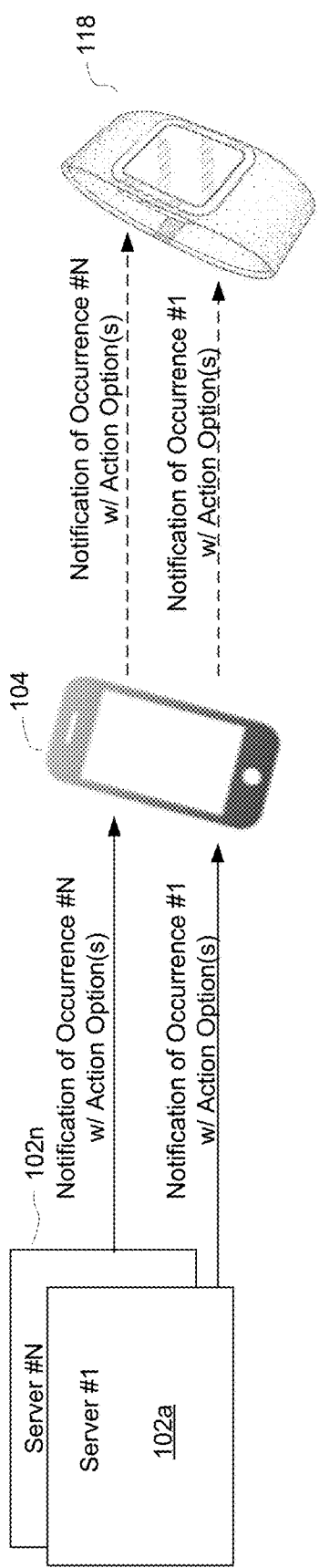
FIG. 2 illustrates an example of transmitting notifications to a client computing platform and/or a wearable device for presentation to the given user in accordance with one or more implementations.

FIG. 2 illustrates an example of transmitting notifications to a client computing platform and/or a wearable device for presentation to the given user. The notifications may include one or more action options. As shown, one or more notifications and/or action options (e.g., the notifications generated and/or the action options determined by notification component 118) regarding occurrences in one or more online game(s) participated in by the given user may be transmitted from servers 102 to client computing platform 104. In some implementations, client computing platform may transmit the notifications including the action options to the wearable device 120 for presentation to the given user. Whether or not the notifications including the action options should be transmitted to wearable device 120 may be determined by one or more components of servers 102 based on one or more of the occurrences, the user activity information, the user response information, other user response information, and/or other information.

Returning to FIG. 1, notification component 118 may be configured to determine one or more action options. The one or more action options may be determined for presentation in association with the notification on the computing platform associated with the user. The action options may indicate available actions that a user may request to execute within the virtual space in response to the occurrence and/or notification. The action options may correspond to individual action requests for executing actions in the instance of the virtual space. Notification component 118 may be configured to transmit the individual action requests from the computing platform associated with the user. The individual action requests may be transmitted to server(s) 102 (e.g., game component 112) and/or other components of system 100. The individual action requests may be transmitted in response to the corresponding action options being accepted by the user. The action options may be accepted via the computing platform associated with the user. Accepting the action options may include selecting one or more of the action options via one or more inputs on the client computing platform associated with the user and/or a wearable device (e.g., wearable device 120) on which the notification and/or action options are presented to the user. The one or more inputs may include touch input, voice input, secondary device input (e.g., a mouse, keyboard, etc.), button input, and/or other input via which a user may select and/or accept one or more action options.

The action options may be accepted via the computing platform associated with the user without launching and/or running the client game application. As such, for example, a user may accept one or more action options that correspond to one or more action requests for executing one or more actions in the virtual space without launching and/or running the client game application.

Figure 3:
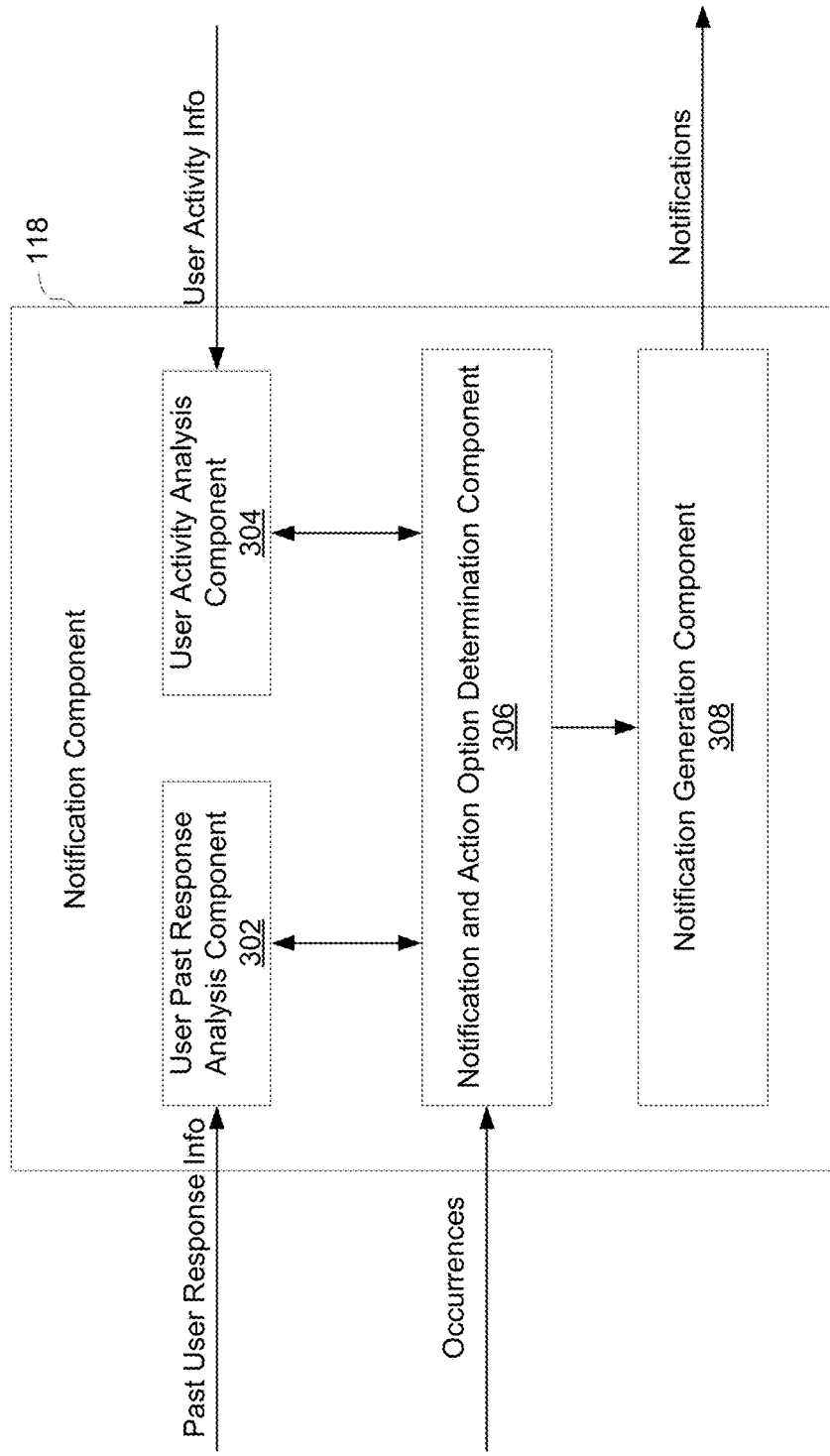
FIG. 3 illustrates an exemplary implementation of the notification component shown in FIG. 1 in accordance with one or more implementations.

In some implementations, the generation of the notifications and/or determination of one or more action options for presentation in association with the notification by the notification component 118 may be based on user presence information, information obtained by the user response information component 208, user current activities in the real-world as determined by the user activity component 210, and/or any other consideration. FIG. 3 illustrates an exemplary implementation of the notification component 118 in accordance with one embodiment of the disclosure. As shown in FIG. 3, the notification component 118 may comprise a user past response analysis component 302, a user activity analysis component 304, a notification and action option determination component 306, a notification generation component 308, and/or any other components.

The user past response analysis component 302 may be configured to receive user response information and analyze user responses to past occurrences in the online game. The user past response analysis component 302 may receive user response information from user component 114. By way of example, the user past response analysis component 302 may analyze the user responses to a given occurrence in the online game and/or determine one or more of: whether or not the given user initiates an action in response to the given occurrence, the frequency at which the given user initiates an action during a predetermined period after the given occurrence, the average time elapsed between the given occurrence and when the user initiates an action, and/or any other results. For instance, the user past response analysis component 302 may determine that during the past week, the user initiated an action on average one minute after his/her base was attacked (e.g., the given occurrence) in the virtual space of the online game.

The user activity analysis component 304 may be configured to analyze the user current activity and determine whether the user is available to interact with the online game(s). As shown, the user activity analysis component 304 may receive and/or obtain user activity information regarding a users' current activity in the real-world by a given user. The user activity information may be obtained, for example, from user component 114. Using the received user activity information, the user activity analysis component 304 may determine whether the user is available to interact with the online game(s). By way of non-limiting example, the user activity analysis component 304 may analyze the user's current activity and determine that the given user is driving a car because the speed of the user's activity is more than 60 miles an hour and/or the given user is consistently moving his hands as indicated by the received user current activity information. Continuing the example, the user activity analysis component 304 may determine that the given user is not available to interact with the online game(s). As another example, the user activity analysis component 304 may analyze the user's current activity and determine that the given user is sitting idle because the speed of the user activity is zero and/or the given user is moving his hands infrequently. In this example, the user activity analysis component 304 may determine that the given user is available to interact with the online game(s). Still as another example, the user activity analysis component 304 may analyze the user's current activity and determine that the given user is sleeping because the speed of the user activity is zero and/or the given user is not moving his hands and/or has not moved his hands for one hour or more. In that example, the user activity analysis component 304 may determine that the given user is not available to interact with the online game(s).

The notification and action option determination component 306 may be configured to receive information indicating occurrences in the online game(s). For example, the notification and action option determination component 306 may receive such information from the occurrence detection component 116. For example, the notification and action option determination component 306 may receive information indicating a given occurrence in the online game. Upon receiving such information, the notification and action option determination component 306 may be configured to instruct the user past response analysis component 302 to analyze user responses to the given occurrence in the past and/or to instruct the user activity analysis component 304 to analyze user current activity in the real-world. The notification and action option determination component 306 may be configured to determine whether a notification should be generated and/or one or more action options for presentation on the client computing platform 104 and/or wearable device 120 based on the results of the analyses by the user past response analysis component 302 and/or user activity analysis component 304.

For example, user past response analysis component 302 may be configured to determine a number of times the individual ones of a set of past action requests were initiated by a given user in response to a given occurrence in the virtual space. User past response analysis component 302 may rank the individual ones of the past action requests in the set based on the corresponding number of times the individual past action requests were initiated by the given user in response to the given occurrence in the virtual space. Notification and action option determination component 306 may be configured to determine one or more action options action options for presentation on the client computing platform and/or wearable device based on the ranking.

In some implementations, the determination of whether or not the notification regarding the given occurrence in the online game should be presented and/or which action options should be presented in association with the notification may be based on one or more predetermined rules. The predetermined rules may indicate and/or be based on user preferences, an analysis of past responses, gameplay, occurrences, and/or other information. For example, the predetermined rules may include a rule indicating the notification regarding the given occurrence should always be generated for presentation on the client computing platform 104 and/or wearable device 120 when the given occurrence is of a certain type (e.g., the first user's base is under attack in the virtual space of the online game). Continuing the example, the predetermined rules may include a rule indicating that the one or more action options for presentation in association with a notification that the first user's base is under attack may include: "Shield My Base for $5.99"; "Ask Alliance for Help"; "Buy some more troops for $2.99". As another example, the predetermined rules may include a rule indicating that the notification regarding the given occurrence should be presented to the user with action options based on the user's past response(s) to the given occurrence, if the user's past responses to the given occurrence indicates that for more than 50% of the past given occurrences, the given user initiated an action in the online game after the given occurrence in the online game. Still as another example, the predetermined rules may include a rule indicating whether and/or which action options should be presented to the user if the user's current activity in the real-world, which may be determined by the user activity analysis component 304, indicates that the user is not available to launch the client game application. Yet still as another example, the predetermined rules may include a rule indicating the notification regarding the first occurrence should be presented to the user if more than x % (e.g., 20%) of other users have initiated an action within one minute after the first occurrence in the online game in the past week. Continuing this example, the action options determined for presentation in associated with the notification of the first occurrence may include one or more of the common actions initiated by the other users within one minute after the first occurrence in the online game in the past week. Other examples of the predetermined rules are contemplated.

Figure 4:
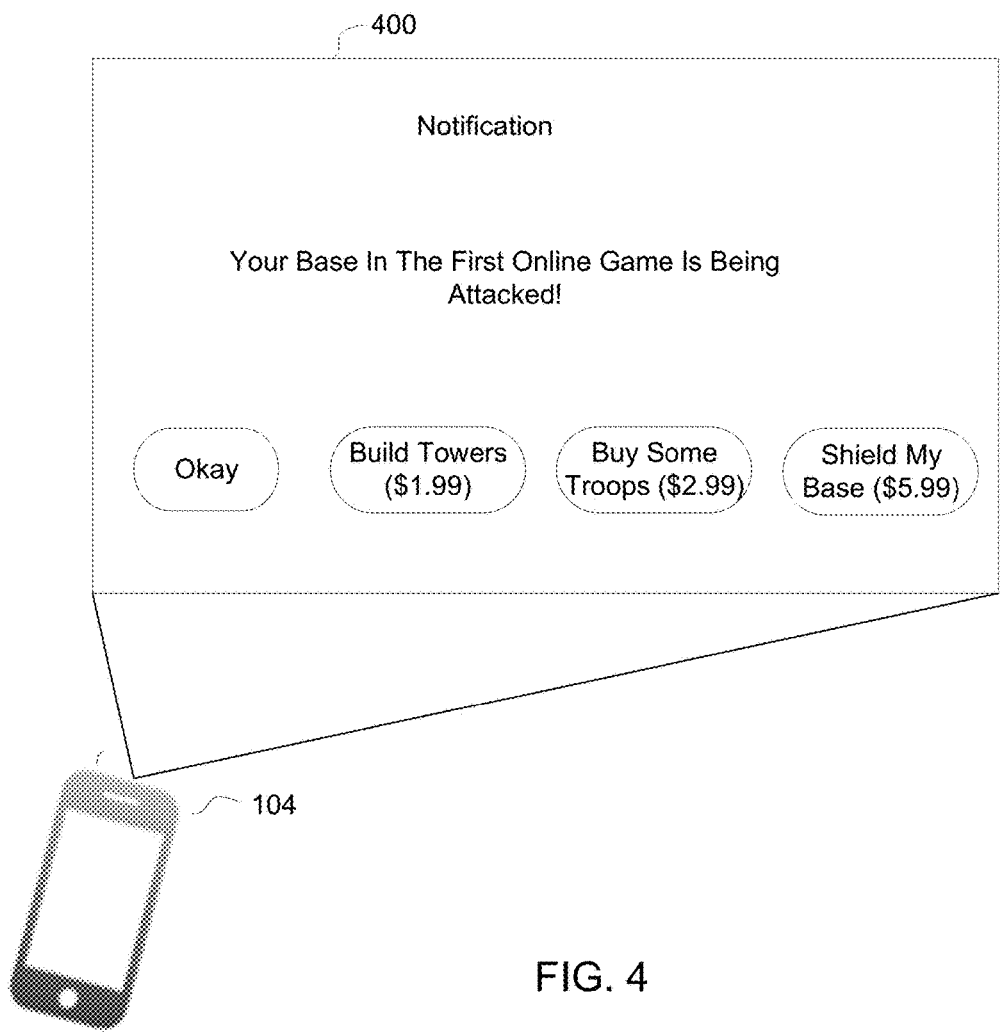
FIG. 4 illustrates an exemplary notification presented to a user in accordance with one or more implementations.

Notification component 118 may be configured to generate notifications and/or determine one or more action options for presentation to the user. FIG. 4 illustrates a sample notification 400 including action options 401A-D being presented on a client computing platform 104. Notification 400 and action options 401 may be presented on client computing platform 104 while application 402 is being run by client computing platform 104. Application 402 may be an application separate and/or different from any client game application. Notification 400 may include a text notification of "Your Base In the First Online Game Is Being Attacked!." Action option 401A may include an action option of "Okay" to not take action. Action option 401B may include "Build Towers ($1.99)." Action option 401C may include "Buy Some Troops ($2.99)." Action option 401D may include "Shield My Base ($5.99)." In response to a user accepting action options 401B-D, the corresponding action may be executed within the virtual space without launching the client game application.

Figure 5:
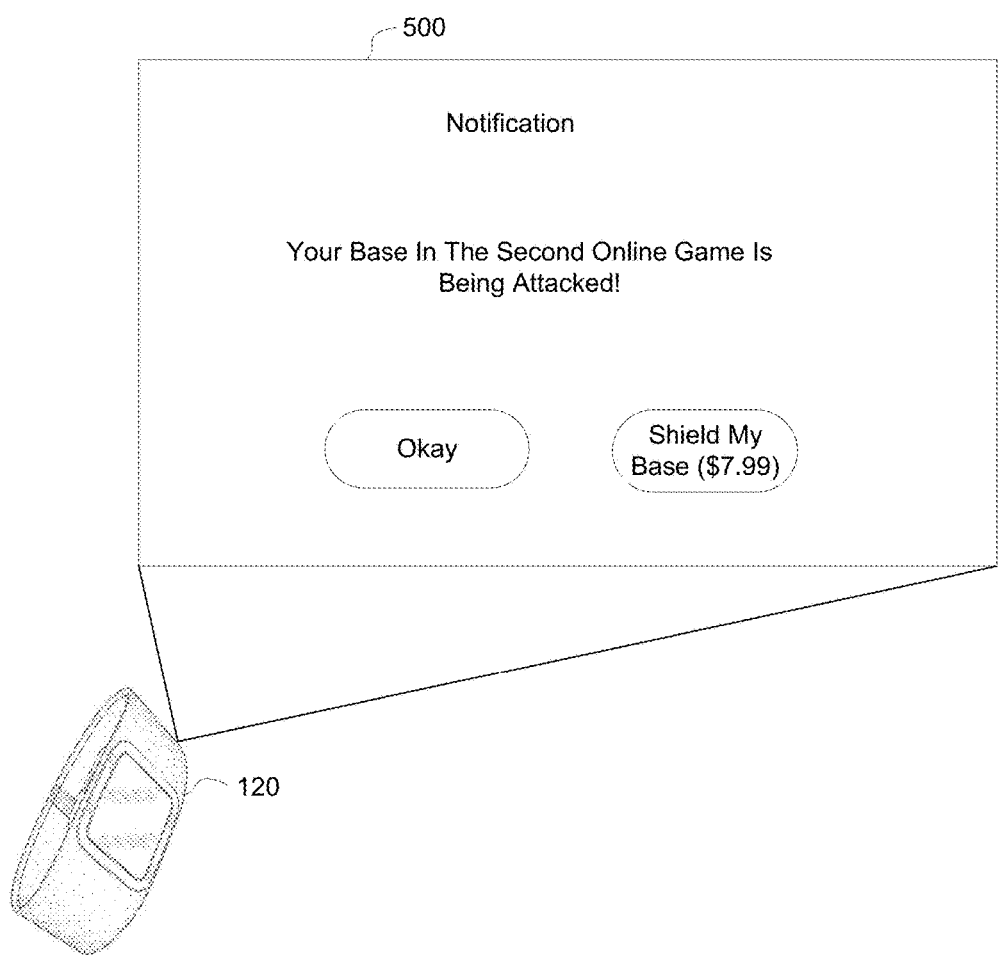
FIG. 5 illustrates another exemplary notification presented to a user in accordance with one or more implementations.

FIG. 5 illustrates a sample notification 500 including action options 501A-B being presented on a wearable device 120. Notification 500 and action options 501 may be presented on wearable device 120. Wearable device 120 may or may not be able to launch the client game application. Notification 500 may include a text notification of "Your Base In the Second Online Game Is Being Attacked!." Action option 501A may include an action option of "Okay" to not take action. Action option 501B may include "Shield My Base ($7.99)." In response to a user accepting action option 401B, the corresponding action (e.g., the user's base is shielded) may be executed within the virtual space without launching the client game application and/or requiring the user to access the client game application via a client computing platform. In some implementations, for example, notification 500 may be presented via a voice notification feature of wearable device 120 (and/or a client computing platform). The user may accept one or more of the action options via a voice response received at wearable device 120 (and/or a client computing platform). The voice response may be translated and/or transmitted to one or more client computing platforms and/or game servers.

Returning to FIG. 1, game component 112 may be configured to receive one or more of the action requests corresponding to one of more the action options presented. One or more of the action requests may be received from the client computing platform associated with the user. In response to receiving one or more action requests from the client computing platform associated with the user, game component 112 may be configured to execute the one or more actions in the virtual space without launching and/or running the client game application. For example, the action options may include a first action option corresponding to a first action request for executing a first action in the virtual space and game component 112 may be configured to execute the first action in the virtual space. As such, a user may, for example, accept the an action option to take quick action in an online game without going into the full, client-version of the game (e.g., without running and/or initiating the client game application).

The server(s) 102, client computing platform(s) 104, the wearable device(s) 120 and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, the wearable device 120 and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The wearable device 120 associated with a given user may be worn by the given user, for example, on his/her wrist, ankle, waist, or neck, or clipped to or inside the clothing of the user. Example of the wearable device 120 may include a smart watch, smart glasses, a smart bracelet, a smart band, a smart belt, and/or any other type(s) of wearable device. Other designs of wearable device 120, such as a portable device or a device that can be attached to the user's closing, are contemplated.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server(s) 102 may include electronic storage 110, one or more processors 108, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 110 may comprise electronic storage media that electronically stores information. The electronic storage media of electronic storage 110 may include one or both of system storage that is provided integrally (i.e., substantially non-removable) with server(s) 102 and/or removable storage that is removably connectable to server(s) 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 110 may include one or more virtual storage resources (e.g., cloud storage, a virtual private network, and/or other virtual storage resources). Electronic storage 110 may store software algorithms, information determined by processor 108, information received from server(s) 102, information received from client computing platforms 104, and/or other information that enables server(s) 102 to function as described herein.

Processor(s) 108 is configured to provide information processing capabilities in server(s) 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118. Processor 108 may be configured to execute components 112, 114, 116, 118 by software; hardware; firmware; some combination of software, hardware, and/or firmware; and/or other mechanisms for configuring processing capabilities on processor 108.

It should be appreciated that although components 112, 114, 116, 118, 302, 304, 306, and 308 are illustrated herein as being co-located within a single processing unit, in some other implementations, one or more of components 112, 114, 116, 118, 302, 304, 306, and 308 may be located remotely from the other components. The description of the functionality provided by the different components 112, 114, 116, 118, 302, 304, 306, and 308 described below is for illustrative purposes, and is not intended to be limiting, as any of components 112, 114, 116, 118, 302, 304, 306, and 308 may provide more or less functionality than is described. For example, one or more of components 112, 114, 116, 118, 302, 304, 306, and 308 may be eliminated, and some or all of its functionality may be provided by other ones of components 112, 114, 116, 118, 302, 304, 306, and 308. As another example, processor 108 may be configured to execute one or more additional components that may perform some or all of the functionality attributed below to one of components 112, 114, 116, 118, 302, 304, 306, and 308.

Figure 6:
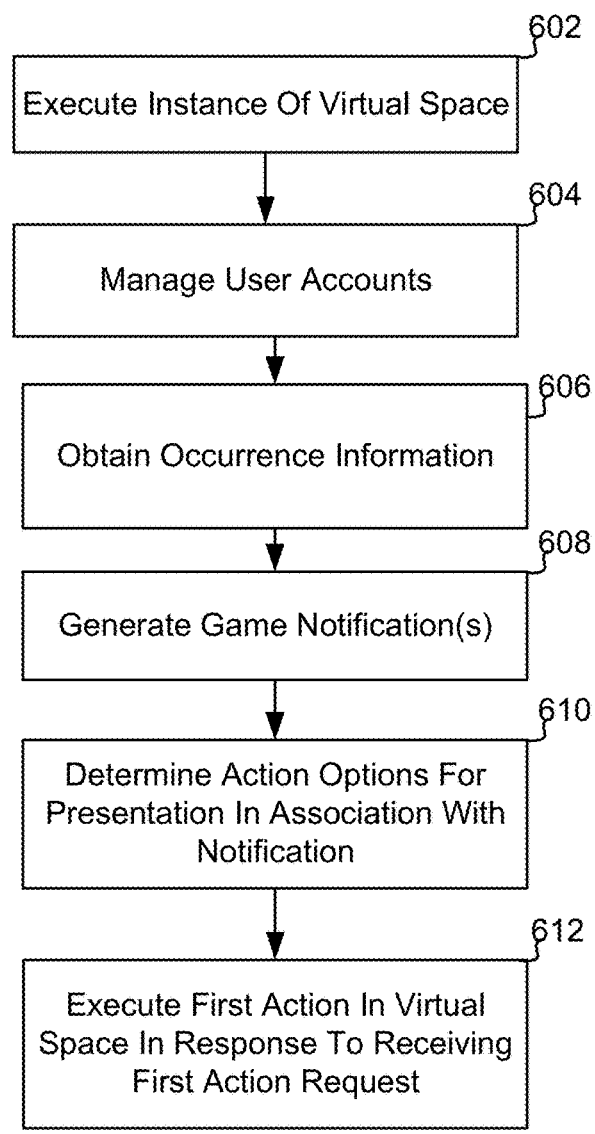
FIG. 6 illustrates a method for facilitating contextual game notifications and smart action options for one or more online games in accordance with one or more implementations.

FIG. 6 illustrates a method for contextual game notifications and smart action options for one or more online games in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an instance of a virtual space in which an online game takes place may be executed. The instance of the virtual space may be implemented by receiving commands from client computing platforms associated with users and/or executing the commands in the instance of the virtual space to facilitate participation of the users in the online game. Participation of the users in the online game may be facilitated through client game applications implemented on the client computing platforms associated with the users. In some implementations, operation 602 may be performed by a game component the same as or similar to game component 112 (shown in FIG. 1 and described herein).

At an operation 604, user accounts comprising user information regarding the users may be managed. The user information may include user presence information. The user presence information may indicate whether the users are participating in the online game through the client game applications. The user accounts may include a first user account associated with a first user. The first user account may comprise first user presence information. The first user presence information may indicate whether the first user is participating in the online game through a client game application. In some implementations, operation 604 may be performed by a user component the same as or similar to user component 114 (shown in FIG. 1 and described herein).

At operation 606, the occurrence information regarding occurrences in the virtual space may be obtained. First occurrence information indicating a first occurrence in the virtual space may be obtained. The first occurrence may relate to participation in the online game by the first user. In some implementations, operation 606 may be performed by an occurrence detection component the same as or similar to occurrence detection component 116 (shown in FIG. 1 and described herein).

At an operation 608, notifications may be generated for presentation to the first user on a client computing platform associated with the first user. A notification may be generated in response to the first occurrence information being obtained. The notification may be generated further in response to a determination that the first user is not participating in the online game through any client game application. The determination that the first user is not participating in the online game through any client game application may be based on the first user presence information. A notification may be generated for presentation to the first user on a computing platform associated with the first user. The notification may include information indicating the first occurrence in the virtual space. In some implementations, operation 608 may be performed by notification component the same as or similar to notification component 118 (shown in FIG. 1 and described herein).

At an operation 610, one or more action options for presentation in association with the notification on the computing platform associated with the first user may be determined. The action options may correspond to individual action requests for executing actions in the instance of the virtual space. As such, the individual action requests may be transmitted from the computing platform associated with the first user in response to the corresponding action options being accepted by the first user. The corresponding action options may be accepted by the first user via the computing platform associated with the first user without launching the client game application. The action options may include a first action option corresponding to a first action request for executing a first action in the virtual space. In some implementations, operation 610 may be performed by notification component the same as or similar to notification component 118 (shown in FIG. 1 and described herein).

At an operation 612, the first action may be executed in the virtual space without launching the client game application. The first action may be executed in the virtual space in response to receiving the first action request from the client computing platform associated with the first user. In some implementations, operation 612 may be performed by notification component the same as or similar to notification component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating contextual game notifications and smart action options for one or more online games, the system comprising:
  one or more physical computer processors configured by machine-readable instructions to:
    execute an instance of a virtual space in which an online game takes place, and to implement the instance of the virtual space by receiving commands from client computing platforms associated with users and executing the commands in the instance of the virtual space to facilitate participation of the users in the online game through client game applications implemented on the client computing platforms associated with the users;
    manage user accounts comprising user information regarding the users, the user information including user presence information indicating whether the users are participating in the online game through the client game applications, wherein the user accounts include a first user account associated with a first user, the first user account comprising first user presence information, indicating whether the first user is participating in the online game through a client game application;
    obtain occurrence information regarding occurrences within the virtual space such that first occurrence information indicating a first occurrence in the virtual space is obtained;

in response to the first occurrence information being obtained and further to a determination, based on the first user presence information, that the first user is not participating in the online game through any client game application, a notification is generated for presentation to the first user on a computing platform associated with the first user, the notification including information indicating the first occurrence in the virtual space;

identify at least one previous occurrence that matches the first occurrence information in the virtual space, wherein the at least one previous occurrence occurred prior to the first occurrence;

determine one or more previous action options selected by the user in response to the at least one previous occurrence within the virtual space while communicating through the client game application;

determine one or more action options for presentation in association with the notification on the computing platform associated with the first user, wherein the one or more action options presented to the user are determined based at least in part on the one or more previous action options selected by the user in response to the at least one previous occurrence, the action options corresponding to individual action requests for executing actions in the instance of the virtual space;

transmit the notification and the one or more action options to the computing platform associated with the first user;

receive a first action request transmitted from the computing platform associated with the first user in response to a first action option of the one or more action options being selected by the first user via the computing platform associated with the first user without launching the client game application; and in response to receiving the first action request from the client computing platform associated with the first user, execute the first action in the virtual space without launching the client game application.

2. The system of claim 1, wherein the computing platform associated with the first user is a wearable device.

3. The system of claim 1, wherein the notification for presentation on the computing platform associated with the first user includes a text notification, a voice notification, a push notification, and/or a haptic notification.

4. The system of claim 1, wherein the first action option is presented on the computing platform through voice and wherein the first user is enabled to accept the first action option via the computing platform associated with the first user through a voice command.

5. The system of claim 1, wherein the determination of the one or more action options based on the first user response information includes:

determining a number of times the individual ones of a set of past action requests were initiated by the first user in response to the at least one previous occurrence in the virtual space;

ranking the individual ones of the past action requests in the set in accordance with the corresponding number of times the individual past action requests were initiated by the first user in response to the at least one previous occurrence in the virtual space; and determining the one or more action options for presentation on the client computing platform based on the ranking.

6. The system of claim 1, wherein the determination of the one or more action options includes:

obtaining one or more rules regarding action options for presentation in response to the first occurrence in the virtual space; and determining the one or more action options based on the one or more rules.

7. A computer-implemented method of facilitating contextual game notifications and smart action options for one or more online games, the method being implemented in a computer that includes one or more processors configured by machine-readable instructions, the method comprising:

executing an instance of a virtual space in which an online game takes place, and to implement the instance of the virtual space by receiving commands from client computing platforms associated with users and executing the commands in the instance of the virtual space to facilitate participation of the users in the online game through client game applications implemented on the client computing platforms associated with the users;

managing user accounts comprising user information regarding the users, the user information including user presence information indicating whether the users are participating in the online game through the client game applications, wherein the user accounts include a first user account associated with a first user, the first user account comprising first user presence information, indicating whether the first user is participating in the online game through a client game application;

obtaining occurrence information regarding occurrences within the virtual space such that first occurrence information indicating a first occurrence in the virtual space is obtained;

in response to the first occurrence information being obtained and further to a determination, based on the first user presence information, that the first user is not participating in the online game through any client game application, a notification is generated for presentation to the first user on a computing platform associated with the first user, the notification including information indicating the first occurrence in the virtual space:

identifying at least one previous occurrence that matches the first occurrence information in the virtual space, wherein the at least one previous occurrence occurred prior to the first occurrence;

determine one or more previous action options selected by the user in response to at least one previous occurrence within the virtual space;

determining one or more action options for presentation in association with the notification on the computing platform associated with the first user, wherein the one or more action options presented to the user are determined based at least in part on previous action options selected by the user in response to the at least one previous occurrence, the action options corresponding to individual action requests for executing actions in the instance of the virtual space, wherein the individual action requests are transmitted from the computing platform associated with the first user in response to the corresponding action options being accepted by the first user via the computing platform associated with the first user without launching the client game application, wherein the action options including a first action option corresponding to a first action request for executing a first action in the virtual space;

transmitting the notification and the one or more action options to the computing platform associated with the first user; and in response to receiving the first action request from the client computing platform associated with the first user, execute the first action in the virtual space without launching the client game application.

8. The method of claim 7, wherein the computing platform associated with the first user is a wearable device.

9. The method of claim 7, wherein the notification for presentation on the computing platform associated with the first user includes a text notification, a voice notification, a push notification, and/or a haptic notification.

10. The method of claim 7, wherein the first action option is presented on the computing platform through voice and wherein the first user is enabled to accept the first action option via the computing platform associated with the first user through a voice command.

11. The method of claim 7, wherein the determination of the one or more action options based on the first user response information includes:

determining a number of times the individual ones of a set of past action requests were initiated by the first user in response to the at least one previous occurrence in the virtual space;

ranking the individual ones of the past action requests in the set in accordance with the corresponding number of times the individual past action requests were initiated by the first user in response to the at least one previous occurrence in the virtual space; and determining the one or more action options for presentation on the client computing platform based on the ranking.

12. The method of claim 7, wherein the determination of the one or more action options includes:

obtaining one or more rules regarding action options for presentation in response to the first occurrence in the virtual space; and determining the one or more action options based on the one or more rules.

\* \* \* \* \*